United States Patent [19]

Nordin

[11] 4,101,139
[45] Jul. 18, 1978

[54] BEARING BRACKET ASSEMBLY FOR A SUBMERSIBLE MOTOR DRIVEN PUMP

[75] Inventor: Dag Nordin, Taby, Sweden

[73] Assignee: ITT Industries, Incorporated, New York, N.Y.

[21] Appl. No.: 784,223

[22] Filed: Apr. 4, 1977

[30] Foreign Application Priority Data

May 10, 1976 [SE] Sweden .............................. 7605256

[51] Int. Cl.² ............................................ F16J 15/40
[52] U.S. Cl. ...................................... 277/22; 277/59; 277/65; 277/71
[58] Field of Search ............................. 277/53, 55–57, 277/65, 22, 59, 70, 71, 72 R, 72 FM, 73, 74, 75, 79; 308/187.1, 187.2

[56] References Cited

U.S. PATENT DOCUMENTS

| 2,032,817 | 3/1936 | Svenson | 277/73 X |
| 2,245,281 | 6/1941 | Klopak | 277/56 |
| 2,267,994 | 12/1941 | Reynolds et al. | 277/65 |
| 2,641,515 | 6/1953 | Bankauf et al. | 277/56 X |
| 2,721,747 | 10/1955 | Whitfield | 277/53 X |
| 3,037,458 | 6/1962 | Olmstead et al. | 277/65 X |
| 3,122,373 | 2/1964 | Lee et al. | 277/73 X |
| 3,162,451 | 12/1964 | Brose | 277/53 |
| 3,395,645 | 8/1966 | Vilet | 277/65 X |
| 3,591,188 | 7/1971 | Eisner | 277/65 X |
| 3,934,311 | 1/1976 | Thompson | 277/59 X |

FOREIGN PATENT DOCUMENTS

| 880,243 | 12/1942 | France | 277/153 |
| 611,154 | 10/1960 | Italy | 277/71 |

Primary Examiner—Robert S. Ward, Jr.
Attorney, Agent, or Firm—John T. O'Halloran; Peter C. Van Der Sluys

[57] ABSTRACT

An improved bearing bracket is provided for a submersible close-coupled motor and pump wherein the bearing bracket supports an outer non-rotating ring of a ball bearing that rotatably supports the motor shaft at a location between the motor and pump. The bearing bracket sealingly supports two concentric non-rotating seal elements that engage a radially extending flange mounted on the end of the motor shaft to provide a seal between the pump and the motor housings. The space between the seal elements is connected to a reservoir for supplying a lubricating and cooling medium for the seal elements.

8 Claims, 1 Drawing Figure

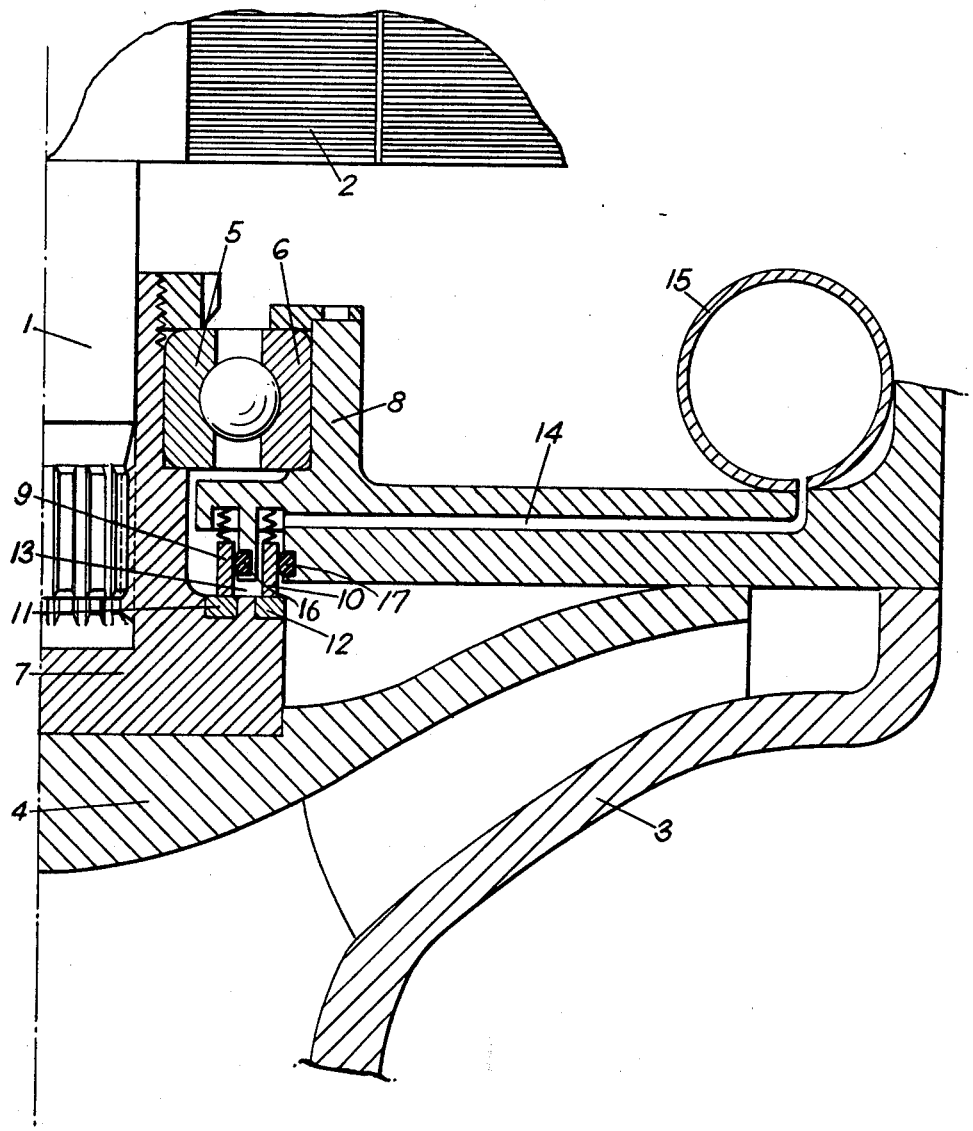

BEARING BRACKET ASSEMBLY FOR A SUBMERSIBLE MOTOR DRIVEN PUMP

BACKGROUND OF THE INVENTION

1. Field of the Invention

This invention broadly relates to close-coupled submersible electric pumps and more particularly relates to a bearing bracket assembly for such pumps.

2. Description of the Prior Art

There are many applications wherein mechanical seals are used about rotating shafts that pass through nonrotating walls for the purpose of sealing one side of the wall from the other. Such a situation is most commonly found in pumps where the pumped medium in the pump housing must be prevented from passing into the housing of the driving unit.

In order to decrease the risk of leakage, two mechanical seals are usually arranged between the pump housing and the driving unit housing. It is common to provide a space between the two mechanical seals and to fill this space with oil for the purpose of cooling and lubricating the sealing surfaces. It is also possible to ascertain the condition of the seals by examining the oil. In order to facilitate the replacement of seals, they are usually mounted in a single mounting bracket so that they may be removed as a unit. An example of such a device is shown in U.S. Pat. No. 2,950,931.

Heretofore, the prior art seal assemblies have suffered from several disadvantages. The pair of mechanical seals and the intermediate oil space were axially disposed and therefore encompassed a considerable length of the motor shaft. Thus, the drive shaft between the motor and the pump impeller was excessively long having a tendency to bend and increased bearing loads caused by the cantilever effect. Thus, the shaft had to be quite thick in order to keep shaft bending within reasonable limits and larger size bearings were required to handle the increased bearing load. The additional shaft length severely reduced the heat transfer from the bearings and the motor to the pump housing where the heat was dissipated into the pumped medium. The seals were also quite sensitive to axial expansion of the drive shaft.

SUMMARY OF THE INVENTION

The present invention reduces the effects of the above mentioned problems by forming the non-rotating bearing bracket in such a way that it directly or indirectly supports two concentric sealing surfaces, each constituting a non-rotating part of two separate seals for sealing the shaft supported by the bearing. The space between the two seals is connected to a remote reservoir by passages formed in the bearing bracket.

The reservoir contains a medium for lubricating and cooling the seals.

It is an object of this invention to provide a bearing bracket assembly that is adapted to mount a pair of concentric mechanical seals for providing a seal between a pump housing and a driving unit housing.

It is another objective of the present invention to reduce length of the shaft between the motor and pump, thereby reducing shaft bending and bearing loads.

DESCRIPTION OF THE DRAWING

In the drawing, there is shown a partial vertical section of the bearing bracket portion of a submersible closecoupled pump and an electric motor.

DETAILED DESCRIPTION OF THE INVENTION

Referring to the drawing, there is shown a motor 2 having a shaft 1 connected to an impeller 4 located in a pump housing 3. A ball bearing having inner and outer rings 5 and 6 respectively rotatably mounts shaft 1 in a nonrotating bearing bracket 8.

A socket 7 is non-rotatably attached to shaft 1 for mounting the inner ring 5 of the ball bearing and for providing a radially extending flange on which there is mounted rotating ring portions 11 and 12 of a pair of mechanical seals. The socket may be attached to the shaft using a wedge or a pressure oil joint or other similar connecting means.

Bearing bracket 8 is adapted to mount non-rotating rings 9 and 10 of the pair of mechanical seals. Rings 9 and 10 are spaced apart to define a space 13 therebetween. Bearing bracket 8 also includes a conduit means 14 for connecting the space 13 to a reservoir 15 mounted to the non-rotating portion of the device.

Socket 7 is preferably designed so that impeller 4 may be attached directly thereto instead of directly to the shaft so that the shaft is not weakened by any reduction in diameter, and the impeller is attached to a relatively large diameter connecting means. It is to be noted that with this structure, the pumped medium will not come in contact with the shaft, thus eliminating the requirement that the shaft be made of a non-corrosive material.

The bearing bracket 8 supports the non-rotating seal rings 9 and 10 so that the non-rotating seal rings contact the rotating rings 11 and 12 to make a seal therebetween. An additional seal means in the form of "O" rings 16 and 17 are provided between each of the non-rotating rings 9 and 10 and the bearing bracket 8 to prevent leakage therebetween.

Preferably, space 13 between the non-rotating seal rings 9 and 10 is provided with a cooling or lubricating liquid such as oil. Since the space 13 is relatively small and cannot contain a large amount of cooling medium, the space is connected by way of one or more conduits 14 to a larger reservoir 15. Conduits 14 may be formed in bearing bracket 8 as shown in the drawing or may be separate tubular elements mounted to the bearing bracket if so desired. Reservoir 15 may be disposed at any convenient non-rotating location, either within the motor housing or externally thereof above the surface of the liquid being pumped. If the reservoir is disposed above the surface of the liquid being pumped, it is possible to periodically inspect the cooling medium and to thereby ascertain the condition of the seals without the requirement of taking the pump out of its working position.

While in the preferred embodiment, there is shown the use of mechanical seals, it is to be understood that other types of seals, such as non-rigid lip seals or sleeve seals, may be used while practicing the invention.

Thus, the present invention provides a bearing bracket assembly for a pump wherein the bearing and seal assembly may be easily exchanged while providing a minimal axial length for the motor shaft. By maintaining a minimum shaft length, bearing and shaft size may be reduced without reducing the life of the motor pump combination.

What is claimed is:

1. A bearing and seal assembly, comprising:
   a non-rotating bearing bracket;

a ball bearing having an outer non-rotating ring mounted in the bearing bracket;

a shaft;

a socket fixedly attached to the shaft, said socket and shaft being rotatably supported by the inner rotating ring of the ball bearing;

a pair of radially spaced concentric seal means on said socket;

a pair of radially spaced concentric seal means on said bearing bracket for sealingly engaging the pair of spaced concentric seal means on said socket;

a reservoir; and conduit means connecting said reservoir to the space between said seal means whereby lubricating and cooling medium may be provided from the reservoir to the space for lubricating and cooling the seals.

2. An assembly as described in claim 1 in which the seal means comprise mechanical seals.

3. An assembly as described in claim 1, wherein the seal means comprise non-rigid type seal members.

4. An assembly as described in claim 1, wherein the outer bearing ring is rigidly attached to the bracket.

5. An assembly as described in claim 1, wherein the socket is part of an electric motor and the assembly additionally comprises a pump including an impeller connected to the shaft.

6. An assembly as described in claim 5, wherein the reservoir is connected to the non-rotating bearing bracket.

7. An assembly as described in claim 5, wherein the reservoir is located remote from the bearing bracket to facilitate inspection of the lubricating and cooling medium.

8. An assembly as described in claim 1, wherein said socket encompasses the outermost end of the shaft and includes a radially extending flange upon which are formed the radially spaced concentric seal means.

* * * * *